July 5, 1932.  E. BOSSERT  1,865,432
VEHICLE WHEEL
Filed Dec. 20, 1928
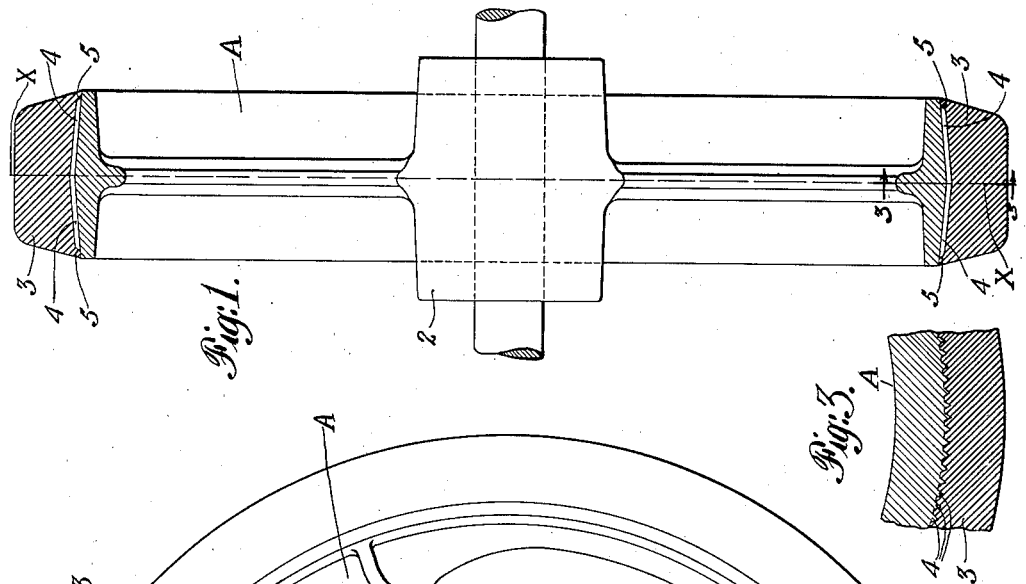
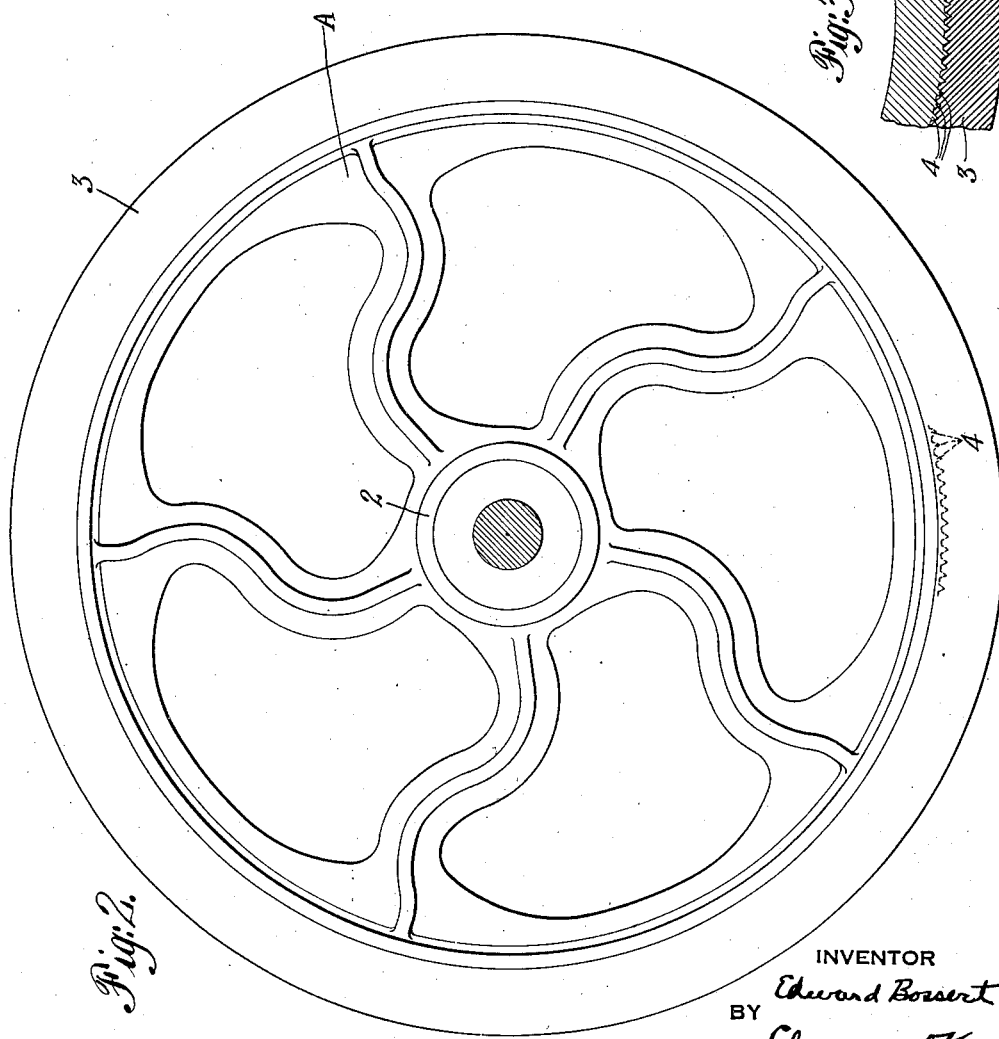
INVENTOR
Edward Bossert
BY
Clarence D Kerr,
ATTORNEY Patented July 5, 1932

1,865,432

UNITED STATES PATENT OFFICE

EDWARD BOSSERT, OF EAST CLEVELAND, OHIO, ASSIGNOR TO NATIONAL MALLEABLE AND STEEL CASTINGS COMPANY, OF CLEVELAND, OHIO, A CORPORATION OF OHIO

VEHICLE WHEEL

Application filed December 20, 1928. Serial No. 327,328.

This invention relates to vehicle wheels and is more particularly concerned with wheels adapted to have rubber tires secured thereto. A prime object of my invention is the provision of a wheel having a periphery so formed as to produce an effective gripping surface for the tire, and which wheel, at the same time, may be cast expeditiously and at a minimum of expense. In carrying out my invention I provide the periphery of the wheel with teeth or corrugations extending transversely thereof; or, in other words, parallel with the axis of rotation of the wheel. Such teeth or corrugations not only aid the rubber in gripping and adhering firmly to the wheel rim, but also, as will appear more specifically hereinafter, permit casting to be effected more readily and and cheaply than has heretofore been the case with wheels having tire-retaining ridges or corrugations. My invention also comprises various features which I shall hereinafter describe and claim.

In the accompanying drawing,

Fig. 1 is a transverse section through a wheel embodying my invention and having a tire secured thereto, the hub of the wheel being shown in elevation.

Fig. 2 is a view of said wheel and tire in side elevation, certain of the transversely extending teeth or ridges on the periphery of the wheel being shown in dotted lines.

Fig. 3 is a detail view in vertical section, taken on line 3—3 of Fig. 1.

The wheel is indicated generally at A, the hub thereof being designated by numeral 2. The wheel in conjunction with which my invention is illustrated is of a type used extensively for wheelbarrows, although it is obviously capable of use in connection with vehicles generally. A solid rubber tire 3 is shown on the rim of said wheel, said tire being caused to adhere to said rim, as by vulcanization. The rim of the wheel is provided with teeth or ridges 4, which teeth extend transversely of said rim. These teeth not only provide the rubber with a gripping surface, aiding materially in retaining the tire on the wheel, but they further produce a structure which may be very readily cast. Heretofore, wheels of this general description have been cast with the tire-retaining teeth or grooves extending circumferentially of the wheel. In forming the molds for such wheels, it is necessary to use a rim core extending entirely around the periphery of the casting in order to provide for the withdrawal of the pattern from the mold. The wheel which I have invented can be molded without the necessity of providing a rim core, whereby the cost of production is substantially lowered.

The line X—X in Fig. 1 designates what is known as the parting line of the wheel mold; that is, this line indicates the plane of separation of the halves or sections of the mold for the wheel. It will be noted that I have shown the diameter of the wheel rim at the parting line somewhat greater than it is at the edges of the rim, and that also the teeth or grooves 4 terminate clear of the edges of said rim, being stopped at the points 5. The rubber tire indicated at 3 molds around the ends of the teeth, and this, together with the formation of the rim with greater diameter at the parting line affords the tire a very effective grip on the rim against lateral displacement.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

What I claim is:

1. A wheel comprising a metallic rim having a periphery of less diameter at the edges than at a portion intermediate said edges, and tire-retaining teeth on said periphery extending transversely thereof, and a tire of flexible material covering said teeth.

2. A wheel comprising a metallic rim having tire retaining teeth on its periphery, said teeth extending transversely of the periphery and having spaces between and around them extending to the edge of the wheel, and a tire of flexible material covering said teeth.

3. A cast wheel having means on its periphery affording a gripping surface for a tire and opposing lateral displacement of said tire with respect to said wheel, said means comprising transversely extending ridges integral with said periphery and having spaces between and around them extending to the edges of the wheel whereby the wheel can be molded without the use of cores around the said periphery, and a tire of flexible material covering said teeth.

4. A wheel comprising a substantially continuous metal rim, transversely extending tire retaining teeth on the outer surface of said rim and integral therewith, the outer surface of said rim, as well as said teeth, extending radially outwardly at least as much in portions disposed progressively nearer the longitudinal middle portion of the rim as in other portions disposed at the lateral edges thereof, and a tire of flexible material covering said teeth, and extending into the spaces therebetween, said tire being adhesively secured to said rim.

5. A metal wheel comprising a substantially continuous metal rim and having spaced transversely extending tire retaining teeth projecting from the face thereof and integral therewith, said teeth and the spaces therebetween extending from the central portion of said rim laterally toward the edges thereof and being of a radial extent outwardly at least as great at the central portion of said rim as at the edges thereof whereby said rim can be cast without the use of cores, and a tire of flexible material covering said teeth and extending into the spaces therebetween, said tire being adhesively secured to said rim.

In testimony whereof, I have signed my name to this specification this 18th day of December, 1928.

EDWARD BOSSERT.